United States Patent
Ali et al.

(10) Patent No.: US 8,121,265 B2
(45) Date of Patent: *Feb. 21, 2012

(54) RETRIEVAL OF DELETED VOICE MESSAGES IN VOICE MESSAGING SYSTEM

(75) Inventors: Syed S. Ali, Allentown, PA (US); Lakshmi Narayana Jampanaboyana, Allentown, PA (US); James J. Greybush, Allentown, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/489,812

(22) Filed: Jun. 23, 2009

(65) Prior Publication Data

US 2009/0274280 A1    Nov. 5, 2009

Related U.S. Application Data

(63) Continuation of application No. 09/296,538, filed on Apr. 22, 1999, now Pat. No. 7,558,381.

(51) Int. Cl.
  *H04M 1/64* (2006.01)
(52) U.S. Cl. .................. 379/88.22; 379/88.07; 704/201
(58) Field of Classification Search .... 379/88.22–88.25; 704/201

See application file for complete search history.

(56) References Cited

U.S. PATENT DOCUMENTS

| | | | |
|---|---|---|---|
| 4,926,462 A | 5/1990 | Ladd et al. | 379/67 |
| 5,128,859 A | 7/1992 | Carbone et al. | 705/4 |
| 5,163,082 A | 11/1992 | Karnowski | 379/88 |
| 5,163,085 A | 11/1992 | Sweet et al. | 379/88.19 |
| 5,369,697 A | 11/1994 | Murray et al. | 379/361 |
| 5,400,393 A | 3/1995 | Knuth et al. | 379/88.27 |
| 5,440,623 A | 8/1995 | Moore et al. | 379/67 |
| 5,483,577 A | 1/1996 | Gulick | 379/88.07 |
| 5,485,506 A | 1/1996 | Recht et al. | 379/67 |
| 5,506,872 A * | 4/1996 | Mohler | 375/240 |
| 5,631,948 A | 5/1997 | Bartholomew et al. | 379/88.18 |
| 5,675,333 A | 10/1997 | Boursier et al. | 341/87 |
| 5,689,550 A * | 11/1997 | Garson et al. | 379/88.18 |

(Continued)

FOREIGN PATENT DOCUMENTS

EP    0 820 182 A2    1/1998

(Continued)

OTHER PUBLICATIONS

Non-Final Office Action; Mailed on Apr. 24, 2002 for corresponding U.S. Appl. No. 09/296,538, filed Apr. 22, 1999; 11 pages.

(Continued)

*Primary Examiner* — Simon Sing
(74) *Attorney, Agent, or Firm* — Mendelsohn, Drucker, & Associates, P.C.; David L. Cargille; Steve Mendelsohn

(57) ABSTRACT

Apparatus and method to allow retrieval of voice messages deleted from the voice message memory of a voice messaging system. A voice messaging system such as a telephone answering device includes a deleted voice message memory for storing voice messages deleted from the voice message memory. The deleted voice messages stored in the deleted voice message memory are retrievable by the user for review subject to rules for permanent deletion of the deleted voice messages (e.g., after a period of time, when the deleted voice message memory approaches capacity, periodically, etc.).

23 Claims, 4 Drawing Sheets

U.S. PATENT DOCUMENTS

| | | | | |
|---|---|---|---|---|
| 5,699,411 | A | | 12/1997 | Becker et al. ............... 379/88.22 |
| 5,761,529 | A | | 6/1998 | Raji et al. ....................... 707/100 |
| 5,912,951 | A | * | 6/1999 | Checchio et al. ........... 379/88.22 |
| 5,922,071 | A | | 7/1999 | Taylor et al. ....................... 713/1 |
| 5,930,337 | A | | 7/1999 | Mohler ...................... 379/88.22 |
| 5,978,757 | A | | 11/1999 | Newton ........................ 704/217 |
| 6,021,181 | A | * | 2/2000 | Miner et al. ............... 379/88.23 |
| 6,049,765 | A | | 4/2000 | Iyengar et al. ................ 704/201 |
| 6,058,180 | A | | 5/2000 | Young ........................... 379/234 |
| 6,061,432 | A | | 5/2000 | Wallace et al. ............ 379/88.18 |
| 6,137,864 | A | | 10/2000 | Yaker .......................... 379/88.22 |
| 6,167,261 | A | * | 12/2000 | Amin ......................... 455/426.1 |
| 6,185,525 | B1 | * | 2/2001 | Taubenheim et al. ......... 704/211 |
| 6,185,574 | B1 | | 2/2001 | Howard et al. ............... 707/102 |
| 6,202,025 | B1 | | 3/2001 | Harada .................... 340/995.18 |
| 6,263,106 | B1 | | 7/2001 | Yamagata ..................... 382/232 |
| 6,266,340 | B1 | * | 7/2001 | Pickett et al. ................. 370/442 |
| 6,275,569 | B1 | | 8/2001 | Cannon ....................... 379/88.01 |
| 6,411,685 | B1 | * | 6/2002 | O'Neal ....................... 379/88.14 |
| 6,493,800 | B1 | | 12/2002 | Blumrich ...................... 711/129 |
| 6,522,727 | B1 | | 2/2003 | Jones .......................... 379/88.23 |
| 6,535,583 | B1 | | 3/2003 | Bobick et al. ................. 379/88.1 |
| 6,597,687 | B1 | * | 7/2003 | Rao .............................. 370/352 |

FOREIGN PATENT DOCUMENTS

| | | | |
|---|---|---|---|
| EP | 820182 | * | 1/1998 |
| EP | 0 872 999 | A2 | 10/1998 |
| EP | 0 893 902 | A2 | 1/1999 |
| JP | 4123548 | | 4/1992 |
| JP | 7250167 | | 9/1995 |
| JP | 9023267 | | 1/1997 |
| JP | 9074579 | | 3/1997 |
| JP | 9172491 | | 6/1997 |
| JP | 9219648 | | 8/1997 |
| JP | 10-200634 | | 7/1998 |

OTHER PUBLICATIONS

Final Office Action; Mailed on Dec. 12, 2002 for corresponding U.S. Appl. No. 09/296,538, filed Apr. 22, 1999; 12 pages.
Final Office Action; Mailed on Jan. 20, 2004 for corresponding U.S. Appl. No. 09/296,538, filed Apr. 22, 1999; 15 pages.
Advisory Action; Mailed on Feb. 6, 2003 for corresponding U.S. Appl. No. 09/296,538, filed Apr. 22, 1999; 3 pages.
Non-Final Office Action; Mailed on Jul. 16, 2003 for corresponding U.S. Appl. No. 09/296,538, filed Apr. 22, 1999; 12 pages.
Final Office Action; Mailed on Dec. 28, 2004 for corresponding U.S. Appl. No. 09/296,538, filed Apr. 22, 1999; 17 pages.
Advisory Action; Mailed on Apr. 7, 2005 for corresponding U.S. Appl. No. 09/296,538, filed Apr. 22, 1999; 2 pages.
Non-Final Office Action; Mailed on Jan. 3, 2006 for corresponding U.S. Appl. No. 09/296,538, filed Apr. 22, 1999; 12 pages.
Non-Final Office Action; Mailed on Jun. 23, 2006 for corresponding U.S. Appl. No. 09/296,538, filed Apr. 22, 1999; 16 pages.
Non-Final Office Action; Mailed on Jan. 26, 2007 for corresponding U.S. Appl. No. 09/296,538, filed Apr. 22, 1999; 17 pages.
Non-Final Office Action; Mailed on Jul. 17, 2007 for corresponding U.S. Appl. No. 09/296,538, filed Apr. 22, 1999; 16 pages.
Non-Final Office Action; Mailed on Jan. 10, 2008 for corresponding U.S. Appl. No. 09/296,538, filed Apr. 22, 1999; 16 pages.
Final Office Action; Mailed on Aug. 4, 2008 for corresponding U.S. Appl. No. 09/296,538, filed Apr. 22, 1999; 16 pages.
Non-Final Office Action; Mailed on Oct. 28, 2008 for corresponding U.S. Appl. No. 09/296,538, filed Apr. 22, 1999; 16 pages.
Notice of Allowance and Fees Due; Mailed on Mar. 2, 2009 for corresponding U.S. Appl. No. 09/296,538, filed Apr. 22, 1999; 6 pages.

* cited by examiner

United States Patent US 8,121,265 B2

RETRIEVAL OF DELETED VOICE MESSAGES IN VOICE MESSAGING SYSTEM

CROSS-REFERENCE TO RELATED APPLICATIONS

This is a continuation of co-pending application Ser. No. 09/296,538, filed on Apr. 22, 1999, the teachings of which are incorporated herein by reference.

BACKGROUND OF THE INVENTION

1. Field of the Invention

This invention relates generally to a voice messaging system. More particularly, it relates to a voice messaging system such as a telephone answering device which is capable of allowing a user to retrieve deleted messages.

2. Background of Related Art

Voice messaging systems (e.g., telephone answering devices (TADs)) are useful devices for both the home and office. Larger voice messaging systems in general work in conjunction with a private branch exchange (PBX) unit to provide voice mailboxes for a large number of users. Smaller voice messaging systems, e.g., telephone answering devices typically operate on a single telephone line and answer an incoming call to an unused (i.e., on-hook) telephone after a predetermined number of rings.

Voice messaging systems and telephone answering devices cause a telephone line to enter an off-hook condition, then play an outgoing greeting message to the caller. After the outgoing greeting message is completed, the caller is allowed to record a voice message on the voice messaging system, e.g., telephone answering device. At a later time, the voice message is replayed by the user, either local to the telephone answering device or via remote connection from another telephone through the public switched telephone network (PSTN).

FIG. 4 illustrates a conventional telephone answering device capable of answering an incoming call on a telephone line.

In FIG. 4, a telephone answering device 11 is connected to a telephone company central office 13 via a telephone line 15. A telephone line interface (TLI) 17 in the telephone answering device 11 provides the conventional isolation, DC and AC impedance as required by telephone company standards. The telephone line interface 17 also provides a ring detect signal to a controller 19. The controller 19 can be any suitable processor, e.g., microprocessor, microcontroller, or digital signal processor (DSP). The ring detect signal indicates to the controller 19 the ringing of an incoming call on the telephone line 15.

After a predetermined number of ring signals typically set at the voice messaging system or telephone answering device, the telephone answering device 11 causes the telephone line interface 17 to place the telephone line in an off-hook state. A voice recorder/playback module 21 plays an outgoing greeting message over the telephone line 15 to the caller. Upon completion of the outgoing greeting message, the caller may record a voice message in voice message memory 23 under the control of the controller 19 and through the voice recorder/playback module 21. A keypad 25 allows the user to select various modes of operation, including the playback of voice messages, and the deletion of certain voice messages.

In some instances, either before reviewing the voice message, during the review of the voice message, or subsequent to reviewing the voice message, the user may either accidentally or intentionally delete a particular voice message from the telephone answering device 11 that they later wish they hadn't deleted. While the conventional telephone answering device 11 allows a user to review recorded voice messages as many times as desired before deletion, if a voice message is deleted, either accidentally or intentionally, the voice message is no longer accessible for review by the user, and is erased from the voice message memory 23.

Accordingly, there exists a need for an improved voice messaging system and technique which allows a user to retrieve deleted voice messages.

SUMMARY OF THE INVENTION

In accordance with the principles of the present invention, a voice messaging system comprises a telephone line interface, a controller, a voice message memory, and a deleted voice message memory. A voice message is initially stored in the voice message memory, and upon deletion of the voice message from said voice message memory, the voice message is stored in the deleted voice message memory.

A method for retrieving deleted voice messages from a voice messaging system in accordance with another aspect of the present invention comprises storing deleted voice messages in a deleted voice message memory, and retrieving the deleted voice messages from the deleted voice message memory for playback.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention provides a voice messaging system (e.g., a telephone answering device) and method which maintains deleted voice messages and subsequently allows a user to retrieve deleted voice messages from the telephone answering device.

In operation, a calling party would call a user who ultimately fails to answer the telephone. After a predetermined number of rings, a telephone answering device in accordance with the principles of the present invention would automatically answer the telephone call by placing the telephone line in an off-hook condition, and initiate a pre-recorded outgoing greeting message. Thereafter, the calling party would record a voice message in voice message memory in the telephone answering device using a voice recorder/playback module. After the voice message is recorded, the calling party hangs up and is disconnected from the telephone line and the telephone answering device. This recording process may occur for a plurality of callers, to establish a plurality of recorded voice messages.

In accordance with the principles of the present invention, a user of the telephone answering device can thereafter playback the recorded voice messages and delete certain voice messages as desired. However, in accordance with the principles of the present invention, upon deletion, a voice message is moved into a "trash can" memory area called a deleted voice message memory for maintained storage until permanently deleted.

The retrieved, deleted voice messages may be played back directly from the deleted voice message memory, or may be recovered into an appropriate coding and/or format commensurate with undeleted voice messages, and moved back to the voice message memory for playback therefrom.

In this way, a user is given a second opportunity to retrieve and playback a particular voice message which they (or another user of the same telephone answering device) deleted earlier.

For efficiency purposes, the voice messages moved to the deleted voice message memory may be more highly compressed than when they were stored in the voice message memory. To this end, a deleted voice message may be re-encoded and/or re-compressed by an appropriate program in the controller in the deletion process of movement from the voice message memory to the deleted voice message memory.

Accordingly, if a deleted voice message is later desired for playback, a user may still be able to retrieve it for playback, subject to rules for permanent deletion of the voice message from the deleted voice message memory (e.g., after a period of time from initial deletion, on a periodic basis, etc.), in accordance with the principles of the present invention.

Although the present invention is shown embodied in a telephone answering device, the present invention is equally applicable to voice messaging systems in general, including voice mail systems.

Figure 1:
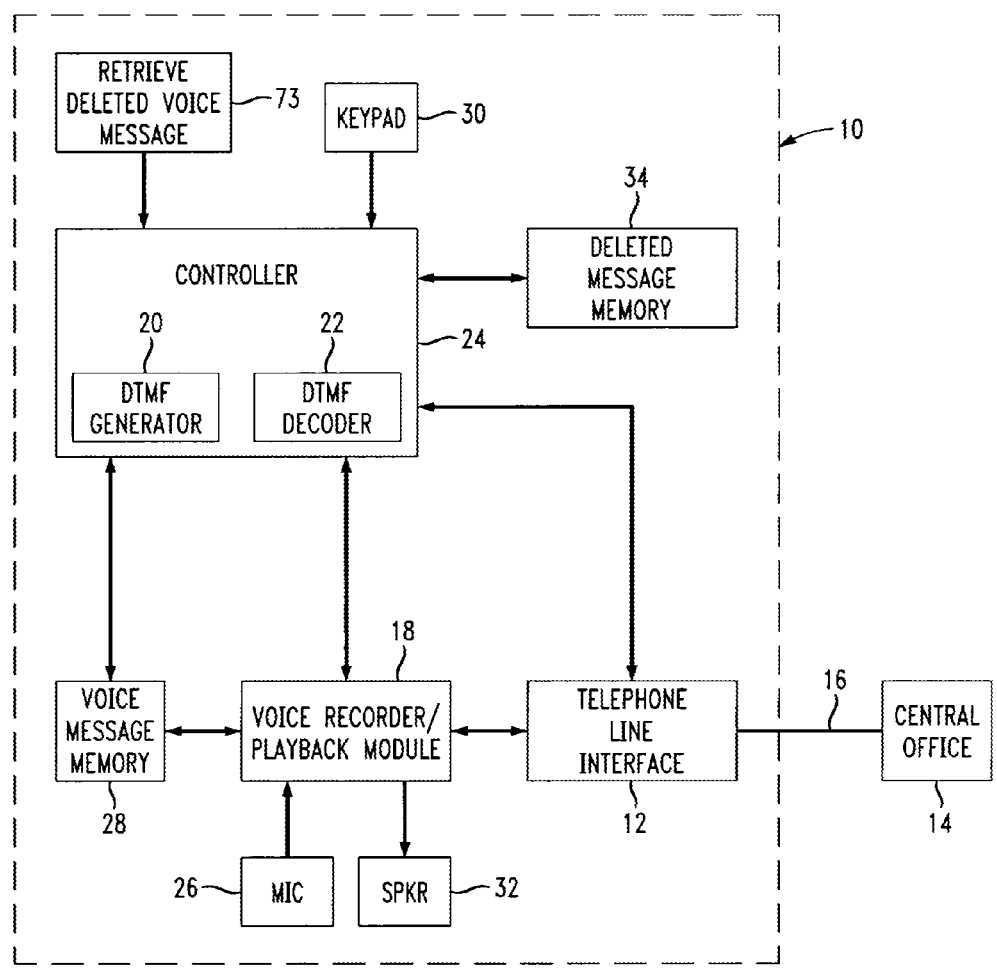
FIG. 1 illustrates an embodiment of a voice messaging system, e.g., a telephone answering device capable of allowing a user to retrieve deleted voice messages from a deleted voice message memory, in accordance with the principles of the present invention.

FIG. 1 illustrates a telephone answering device, indicated generally at 10, capable of recording voice messages from callers, and of allowing a user to retrieve and playback a deleted voice message memory, in accordance with the principles of the present invention.

In particular, in the embodiment of FIG. 1, the telephone answering device 10 includes at least one telephone line interface 12 for interconnection with a telephone company central office 14 via a telephone line 16. The telephone line interface 12 interconnects the telephone line 16 with a voice recorder/playback module 18.

The telephone answering device 10 further includes voice message memory 28 where the voice recorder/playback module 18 initially stores recorded voice messages, and deleted message memory 34 where the controller 24 moves deleted voice messages from the voice message memory 28 upon deletion. Preferably, deleted voice messages stored in the deleted message memory 34 are maintained and thus not allowed to be overwritten by other voice messages.

The user can, if desired, locally record an outgoing greeting message into the telephone answering device 10 through a microphone 26 connected to the voice recorder/playback module 18. In operation, after a desired number of ring signals, the telephone answering device 10 causes the telephone line interface 12 to place the telephone line 16 in an off-hook state, and instructs the voice recorder/playback module 18 to play an outgoing greeting message (e.g., stored in voice message memory 28) on the telephone line 16 to the calling party.

Upon completion of the outgoing greeting message being played to the calling party, the calling party can typically record a voice message in the voice message memory 28 under the control of a controller 24 and through the voice recorder/playback module 18.

The voice message memory 28 is preferably formed in a non-volatile memory, e.g., Flash memory or ARAM, but can also be volatile memory in some applications. In the given example, a given amount of non-volatile memory (e.g., 16 Mb) is partitioned between the voice message memory 28 and a deleted voice message memory 34. The capacity of each of the voice message memory 28 and/or the deleted voice message memory 34 can be adjusted to suit the needs of the particular application. Moreover, the principles of the present invention apply to voice message memory 28 and deleted voice message memory 34 of any capacity.

Moreover, the capacity of each of the voice message memory 28 and/or the deleted voice message memory 34 can be adjusted dynamically. For instance, when the voice message memory 28 passes a threshold amount of use indicating that it is filled to capacity with non-deleted voice messages, a portion of the deleted voice message memory 34 can be allocated for use to store non-deleted voice messages. Then, when the voice messages are deleted from the voice message memory 28, the size of the deleted voice message memory 34 can be enlarged as necessary to store the deleted voice messages. In the preferred embodiment, the new, non-deleted voice messages have priority for storage over deleted voice messages, so that if both the voice message memory 28 and the deleted voice message memory 34 become filled to capacity, certain deleted voice messages, e.g., the oldest, will be automatically deleted as necessary to make room for storage of a newly recorded voice message, or messages deleted based on call related information (e.g., Caller ID information).

The telephone answering device 10 may further include a dual tone multiple frequency (DTMF) generator 20 and/or a DTMF decoder 22 implemented within or external to the controller 24. The DTMF generator 20 provides touch tone signals for use by the telephone answering device 10 to dial out on the telephone line 16 as directed by the user of the telephone answering device 10. The DTMF decoder 22 provides a conventional mechanism for detection of DTMF commands input from a remote telephone via a touch tone keypad at a remote telephone.

The controller 24 controls the overall functions of the telephone answering device 10, including interpretation of commands from the user, including activation of keypad commands directing the playback and/or deletion of recorded voice messages from a conventional keypad 30, and interpretation of the directed retrieval of a deleted voice message using a retrieve deleted voice message button 73 or similar control. The retrieve deleted voice message button 73 may cause the retrieval of all currently deleted voice messages maintained in the deleted voice message memory 34, which is most appropriate if deleted voice messages are permanently removed from the deleted voice message memory 34 on a regular basis. If deleted voice messages are allowed to build up in the deleted voice message memory 34, it may be more desirable to implement the retrieve deleted voice message button 73 to allow selection of a particular deleted voice message. To this end, it may be desirable to include a display and scrolling control to allow review of currently maintained deleted voice messages for selection of only a particularly desired deleted voice message. Alternatively, all voice messages may be played from deleted voice message memory 34, and when a RETRIEVE or similar button is activated, a particular voice message may be retrieved or moved from deleted voice message memory 34 back to the voice message memory 28.

It is also within the principles of the present invention to provide a control mechanism (e.g., a manual "permanently delete" button) to allow the user to bypass movement of a deleted voice message to the deleted voice message memory 34, thereby causing permanent, irretrievable deletion of the voice message.

The controller 24 may be any suitable processor, e.g. a microprocessor, a digital signal processor, or a microcontroller.

The keypad 30 allows the user to select various conventional modes of operation, including the playback of voice messages through a speaker 32 connected to the voice recorder/playback module 18, and/or the initial deletion of voice messages from the voice message memory 28.

Upon deletion of a voice message from the voice message memory 28 of the telephone answering device 10, the deleted voice message is moved to the deleted voice message memory 34 for maintained storage as a deleted voice message, in accordance with the principles of the present invention.

It is within the scope of the present invention to increase the amount of effective capacity in the deleted voice message memory 34 by compressing or re-compressing deleted voice messages using an appropriate low bit rate speech coder. Higher compression of deleted voice messages with respect to undeleted voice messages allows a relatively larger number of voice messages to be stored in the deleted voice message memory 34 as desired by the user.

Figure 2:
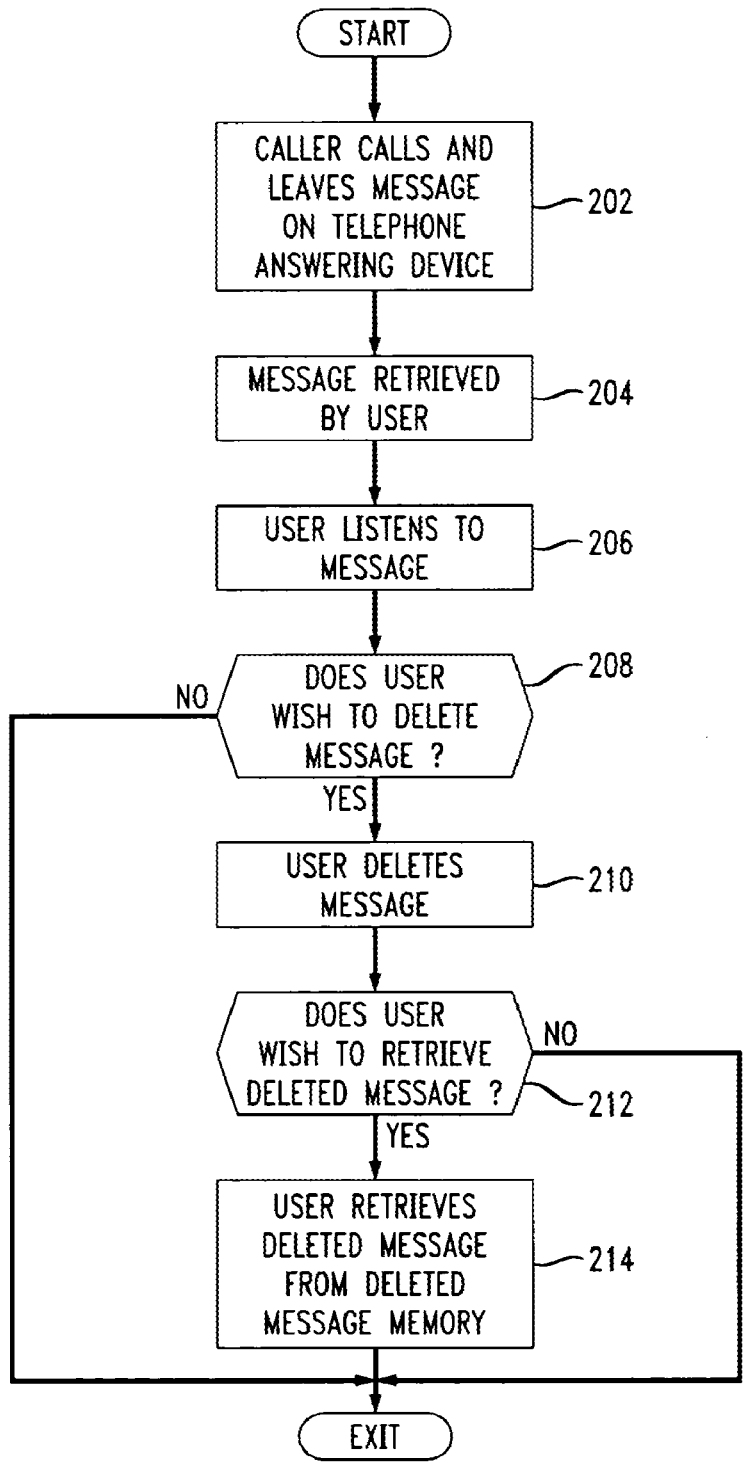
FIG. 2 is a flow chart illustrating an exemplary process by which a user can retrieve a deleted voice message from the deleted voice message memory of the telephone answering device shown in FIG. 1.

FIG. 2 is a flow chart illustrating an exemplary process by which a user can retrieve a deleted voice message from the deleted voice message memory of the telephone answering device shown in FIG. 1.

In particular, with reference to FIG. 2, an incoming caller leaves a voice message on the telephone answering device 10 in step 202. After a predetermined number of rings, the telephone answering device 10 answers the incoming call by causing the telephone line interface 12 to place the telephone line 16 in an off-hook condition. The telephone answering device 10 plays an outgoing greeting message such as "I'm not available right now, please leave a message" or other similar greeting, and the caller records a voice message for storage in the voice message memory 28 of the telephone answering device 10.

In step 204, the user retrieves the voice message, either remotely or locally, from the voice message memory 28.

In step 206, the user plays back as desired one or more recorded voice messages stored in the voice message memory 28 of their telephone answering device 10.

In step 208, the user determines whether the played back voice message is to be deleted from the voice message memory 28 of the telephone answering device 10. If the user does not desire to delete the voice message, the voice message remains stored in the voice message memory 28, at least for a period of time, until the user deletes the voice message from the voice message memory 28 or until the telephone answering device otherwise automatically deletes the recorded voice message (e.g., after 30 days).

In step 210 the user causes the deletion of the voice message from the voice message memory 28. Upon deletion of the voice message from the voice message memory 28, the voice message is moved automatically by the telephone answering device 10, either immediately or at an appropriate later time when the telephone answering device is relatively inactive, to the deleted voice message memory 34.

Later, as shown in step 212, the user determines whether they want to retrieve a particular voice messages from the deleted voice message memory 34.

As shown in step 214, if the user desires to retrieve a particular deleted voice message stored in the deleted voice message memory 34, they simply activate the appropriate button and/or enter the appropriate code into the telephone answering device 10 via the keypad 30, and the telephone answering device 10 automatically retrieves the desired deleted voice message from the deleted voice message memory 34.

In accordance with the principles of the present invention, there are several ways in which deletion of voice messages from the deleted voice message memory 34 can be accomplished by the user of the telephone answering device 10. For instance, the voice messages in the deleted voice message memory 34 can be deleted manually, either individually or as a group, from the deleted voice message memory 34 by the user through input into the controller 24 via the keypad 30. For instance, at any desired time and/or when the deleted voice message memory 34 becomes full or about full, the user of the telephone answering device 10 may permanently delete one or more of the deleted voice messages stored in the deleted voice message memory 34 to allow additional voice messages deleted from the voice message memory 28 to be stored in the deleted voice message memory 34.

Alternatively, the deleted voice messages maintained in the deleted voice message memory 34 can be automatically deleted at certain predetermined time intervals, e.g., every twenty-four (24) hours, once a month, a period of time after the message was initially deleted, etc.

Yet another technique for permanently deleting deleted voice messages from the deleted voice message memory 34 provides that when the number of voice messages in the deleted voice message memory 34 exceeds a predetermined number of message as determined by the telephone answering device 10 itself and/or the user.

Another technique for permanently deleting deleted voice messages in the deleted voice message memory 34 can be automatically deleted when the utilized portion of the deleted voice message memory 34 reaches a predetermined capacity, e.g., ninety-percent full, etc.

In yet another technique, the deleted voice message memory 34 functions as a first in, first out (FIFO) type device wherein the oldest stored deleted voice messages is overwritten by the newest stored deleted voice message.

Finally, deleted voice messages can be permanently removed based on a comparison of associated call related information (e.g., Caller ID information) received with the original recording of the deleted voice message with, e.g., a specialized table of telephone numbers to be maintained (all others deleted), a memory area such as that which contains the speed dial numbers for the particular voice messaging system.

Figure 3:
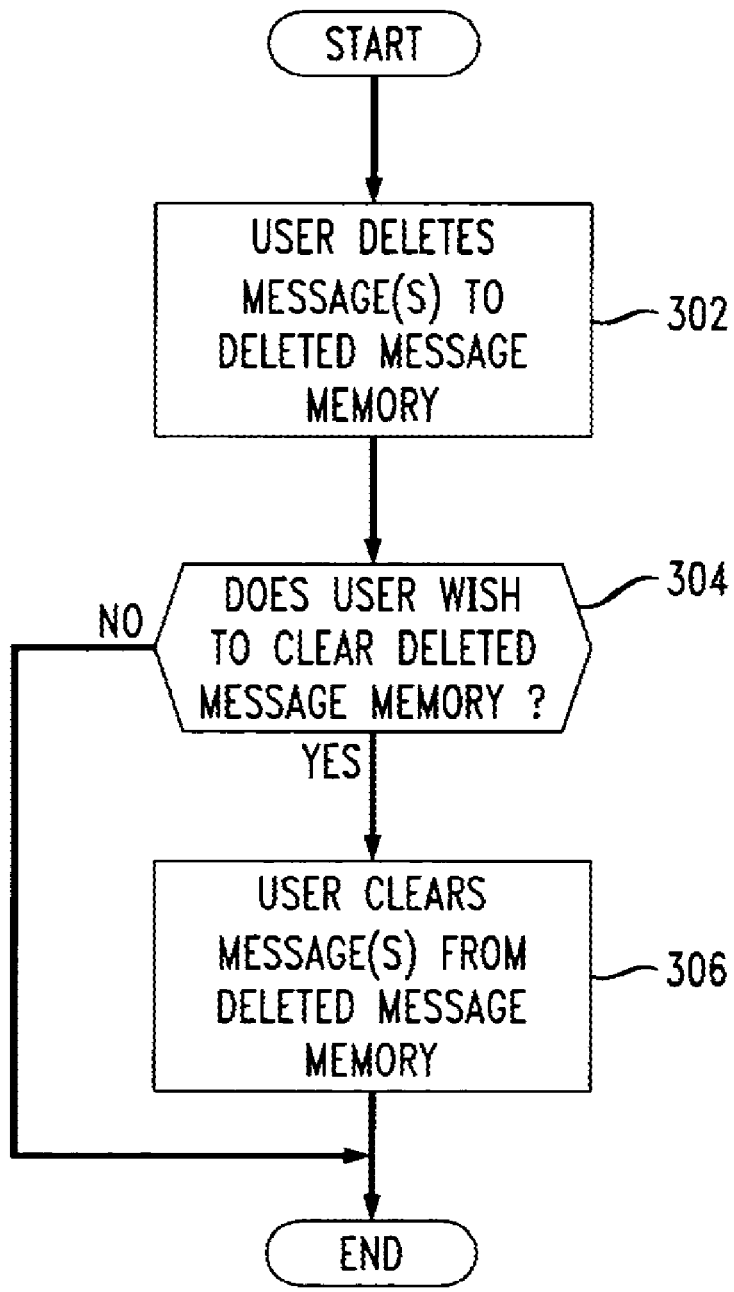
FIG. 3 is a flow chart illustrating an exemplary process by which a user can permanently delete voice messages from the deleted voice message memory of the telephone answering device shown in FIG. 1.
Figure 4:
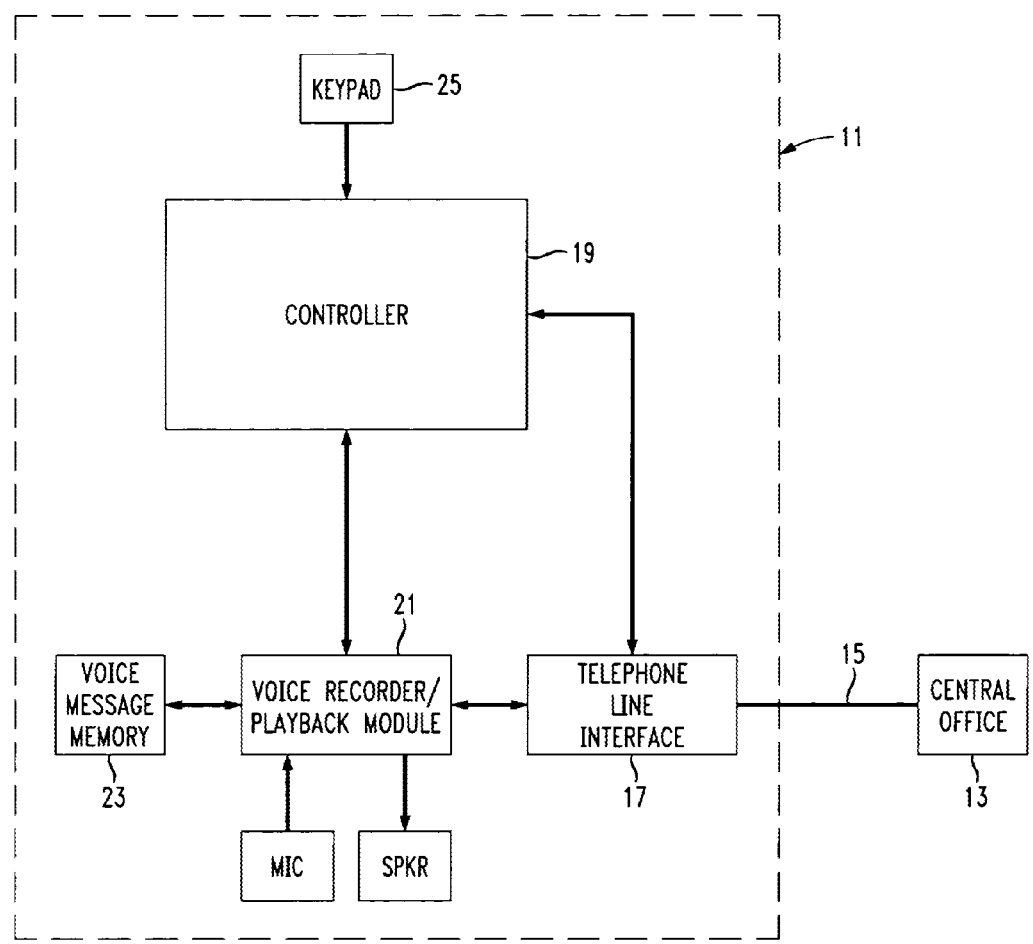
FIG. 4 illustrates a conventional telephone answering device capable of recording and deleting voice message with respect to voice message memory.

FIG. 3 shows an exemplary process by which deleted voice messages may be permanently deleted from the deleted voice message memory 34, in accordance with the principles of the present invention.

In particular, with reference to FIG. 3, in step 302, the user of the telephone answering device 10 initially deletes one or more voice messages from the voice message memory 28 to the deleted voice message memory 34.

As shown in decision step 304, the user determines whether any voice messages stored in the deleted voice message memory 34 should be permanently deleted from the deleted voice message memory 34.

If the user determines to delete any or all of the voice messages from the deleted voice message memory 34, in step 306, the user enters the appropriate manual command(s) into the controller 24 of the telephone answering device 10 via the keypad 30.

Thus, in accordance with the principles of the present invention, a deleted voice message from the voice message memory 28 of the telephone answering device 10 is maintained in deleted voice message memory 34 to allow retrieval of the deleted voice message subject to rules established by the user for permanent deletion of deleted voice messages. Thus, the user is capable of retrieving and playing back even previously deleted voice messages, which is particularly useful in the case of accidentally deleted voice messages which may be important to the user. Furthermore, even intentionally deleted voice messages can be retrieved for playback by the user.

While the invention has been described with reference to the exemplary embodiments thereof, those skilled in the art will be able to make various modifications to the described embodiments of the invention without departing from the true spirit and scope of the invention.

What is claimed is:

1. A voice messaging system, comprising:
   a controller;
   a first memory area; and
   a second memory area, wherein:
   a voice message is initially stored in said first memory area, and upon receipt of a user input to delete said voice message from said first memory area, said voice message is stored in said second memory area;
   before said voice message is initially stored in said first memory, said voice message is encoded using a first bit rate; and
   before said voice message is stored in said second memory area, said voice message is re-encoded using a second bit rate that is lower than the first bit rate.

2. The voice messaging system according to claim 1, further comprising:
   a telephone line interface over which said voice message is initially received by said voice messaging system.

3. The voice messaging system according to claim 1, wherein:
   said voice message stored in said second memory area is retrievable for playback by a user.

4. The voice messaging system according to claim 1, wherein:
   said voice message stored in said second memory area is removable from said second memory area to effect permanent deletion.

5. The voice messaging system according to claim 4, wherein:
   said voice message is permanently deletable from said second memory area via input from a keypad.

6. The voice messaging system according to claim 4, wherein:
   said voice message is removed from said second memory area and permanently deleted at a predetermined time interval.

7. The voice messaging system according to claim 4, wherein:
   said voice message is removed from said second memory area upon reaching a predetermined number of voice messages being simultaneously stored in said second memory area.

8. The voice messaging system according to claim 4, wherein:
   said voice message is removed from said second memory area upon reaching a predetermined percentage use of a memory capacity of said second memory area.

9. The voice messaging system according to claim 1, wherein:
   said voice message stored in said second memory area is compressed more than voice messages stored in said first memory area.

10. The system according to claim 1, wherein said first memory area is user-accessible.

11. The system according to claim 1, wherein said user input is an activation of a user-selectable keypad option to delete said voice message from said first memory area.

12. The system according to claim 1, wherein:
    said voice message is uncompressed when it is initially stored in said first memory area, and
    said voice message is compressed only after receipt of said user input.

13. The system according to claim 1, wherein:
    said first memory area has a first capacity;
    said second memory area has a second capacity; and
    said first and second capacities are dynamically adjusted based on an amount of use of said first memory area.

14. A method for managing a deleted voice message from a voice messaging system, comprising:
    initially storing a voice message in a first memory area;
    storing said voice message in a second memory area upon receipt of a user input to delete said voice message from said first memory area;
    encoding said voice message at a first bit rate, before initially storing said voice message in said first memory, and
    re-encoding said voice message at a second bit rate lower than said first bit rate, before storing said voice message in said second memory area.

15. The method for managing a deleted voice message from a voice messaging system according to claim 14, further comprising:
    retrieving said deleted voice message from said second memory area for playback.

16. The method for managing a deleted voice message from a voice messaging system according to claim 14, further comprising:
    inputting a predetermined code via a keypad for retrieving said deleted voice message from second memory area.

17. The method for managing a deleted voice message from a voice messaging system according to claim 14, further comprising:
    permanently deleting a voice message by removing said voice message stored in said second memory area.

18. The method for managing a deleted voice message from a voice messaging system according to claim 17, wherein:
    said permanent deletion occurs automatically based on a predetermined condition.

19. The method for managing a deleted voice message from a voice messaging system according to claim 18, wherein:
    said predetermined condition corresponds to a length of time after said deleted voice message is stored in said second memory area.

20. The method for managing a deleted voice message from a voice messaging system according to claim 17, further comprising:

removing said voice message from said second memory area upon reaching a predetermined number of voice messages simultaneously stored in said second memory area.

21. The method for managing a deleted voice message from a voice messaging system according to claim 17, further comprising:
    removing said voice message from said second memory area upon reaching a predetermined percentage of a memory capacity of said second memory area.

22. The method for managing a deleted voice message from a voice messaging system according to claim 14, further comprising:
    compressing said deleted voice message, after storage in said first memory area, for storage in said second memory area.

23. Apparatus for retrieving a deleted voice message from a voice messaging system, comprising:
    means for initially storing a voice message in a first memory area;
    means for storing said voice message in a second memory area upon receipt of a user input to delete said voice message from said first memory area;
    means for retrieving said deleted voice message from said second memory area for playback;
    means for encoding said voice message at a first bit rate, before initially storing said voice message in said first memory; and
    means for re-encoding said voice message at a second bit rate lower than said first bit rate, before storing said voice message in said second memory area.

* * * * *